United States Patent [19]

Spence

[11] 4,086,988
[45] May 2, 1978

[54] ROLLING DAM TEMPERATURE CONTROLLED HYDRAULIC COUPLING

[75] Inventor: Henry Joseph Spence, Indianapolis, Ind.

[73] Assignee: Wallace Murray Corporation, New York, N.Y.

[21] Appl. No.: 741,699

[22] Filed: Nov. 15, 1976

[51] Int. Cl.² ................... F16D 35/00; F16D 43/25
[52] U.S. Cl. ................................. 192/58 B; 192/82 T
[58] Field of Search ........................... 192/58 B, 82 T

[56] References Cited

U.S. PATENT DOCUMENTS 3,174,600   3/1965   Oldberg ........................... 192/82 T

*Primary Examiner*—Allan D. Herrmann
*Attorney, Agent, or Firm*—Thomas J. Greer, Jr.

[57] ABSTRACT

A hydraulic coupling of the temperature responsive type and particularly adapted to couple the engine to the radiator fan of an internal combustion engine. The specific improvement resides in a rolling dam adjacent the dump hole which connects the outer portion of the drive chamber containing the drive rotor with a shear liquid reservoir passageway. The dam rolls between two abutments carried by the housing cover so as to assume either of two positions with respect to the dump hole. One position of the dam relative to the dump hole accommodates relative rotation between the drive rotor and coupling housing in one direction, the other position of the dam relative to the dump hole accommodating such relative rotation in the other direction. The rolling dam automatically moves to the proper position relative to the dump hole upon either direction of relative rotation between the drive rotor and coupling housing.

3 Claims, 3 Drawing Figures

ROLLING DAM TEMPERATURE CONTROLLED HYDRAULIC COUPLING

This invention relates to a fluid coupling for a temperature controlled fan drive displaying particular utility in the cooling system of an internal combustion engine. Such fan drives are well known and are presently classified in Class 192, Sub-class 58 of the U.S. Patent Office classification system. One example of such a device is shown in U.S. Pat. No. 3,568,647 issued to Adams. Another example is a literature publication entitled COMPARISON OF MODULATED VISCOUS v. ON-OFF FAN CLUTCHES by Everett G. Blair, Society of Automotive Engineers Publication 740,596 dated Aug. 12–16, 1974, herein incorporated by reference. In an internal combustion engine of the water cooled type, a cooling liquid is passed through passageways in the engine block. These passageways are part of a hydraulic circuit which includes a pump and a heat exchanger, the heat exchanger commonly termed a radiator. In operation, the pump forces the cooling liquid through the passageways in the engine block to cool it, heat from the engine passing to the coolant liquid, the now heated coolant liquid passing to the radiator where fan-driven air passes therethrough to effect the heat exchange operation and thereby lower the temperature of the coolant liquid. The now cooled liquid enters the passageways of the engine block, thus completing the heat exchange cycle. In the type of fan drive which is temperature controlled, a shear liquid coupling rotatably connects the fan to the engine. As the engine rotates, the fan rotates, supplying the force for driving air through the radiator for the above-mentioned heat exchange or cooling function. In a temperature controlled type of operation, the degree of coupling between the engine and the rotary fan is varied according to the temperature requirements of the engine. Thus, when the automobile or other vehicle is traveling rather rapidly, ambient air is naturally forced through the radiator and accordingly the air flow required of the fan is appreciably diminished. On the other hand, if the vehicle is moving relatively slowly or is at a complete standstill, particularly at relatively high ambient temperatures, then the air flow required of the fan is higher. By thus matching air flow supplied by the fan with the cooling requirements of the engine, more efficient operation is enjoyed.

In a typical temperature controlled fluid coupling between the engine and the cooling fan of the radiator cooling system a drive disc is coupled to the engine. The drive disc is received by a housing, the drive disc fitting within a drive cavity of the housing. The housing carries the fan blades. A separate cavity in the coupling, termed a reservoir, communicates through a temperature controlled valve with the drive chamber. The coupling housing includes a dam adjacent the periphery of the drive rotor, and a liquid passageway extends from adjacent the dam and radially inwardly therefrom to the reservoir. The reservoir is thus more or less centrally located within the coupling. The dam construction and location is such that upon relative rotation between the drive rotor and housing, the shear liquid continuously impinges against the dam. It then passes through the passageway back to the reservoir. When relatively high cooling requirements are present, it is desired to have a maximum amount of the shear liquid in the drive chamber. Accordingly, the temperature controlled liquid communication (a valve) between the reservoir and the drive chamber is open its fullest amount. Thus, while liquid is continually being abstracted or emptied from the drive chamber by virtue of the action of the dam, the liquid is continuously being resupplied from the reservoir to the drive chamber through the now fully opened communication. When, however, cooling requirements of the engine are at a minimum, the shear liquid is continuously abstracted from the drive chamber by the dam into the reservoir, with the fluid communication between the reservoir and the drive chamber now closed or partially closed. Thus, a lesser amount of shear liquid is available and fan speed is reduced with a corresponding reduction of parasitic power from the engine.

In typical prior art constructions of hydraulic fan couplings of this type, the dam is cast or otherwise formed in a portion of the housing or housing cover for the coupling. Similarly, the radially extending passageway between the dam and the reservoir chamber is either cast or drilled in the coupling. Thus, the relationship between the dam and the radially extending passageway is fixed at the time of manufacture of the coupling. The outermost portion of the radially extending liquid passageway, termed the dump hole, is thus fixed relative to the liquid abutment face of the dam. Accordingly, relative rotation between the rotor and the housing is possible for one direction of rotation only. If the other direction of relative rotation is desired, it is necessary to cast or otherwise form the dump hole adjacent another, different liquid abutment face of the dam. Thus, in typical prior art constructions, a temperature controlled hydraulic coupling of this type is capable of only one direction of relative rotation between the drive rotor and the driven housing.

According to the practice of this invention, a dam is provided for a hydraulic coupling which enables the coupling to be used for either direction made of relative rotation between the rotor and the housing. This is done by constructing the dam such that it is capable of automatically assuming either of two fixed angular positions with respect to the housing. The dam is in the general form of a right circular cylinder and is positioned in a cage for movement therein between a first position on one side of the dump hole and a second position on the other side of the dump hole. The inertia force of the shear liquid or frictional contact with the periphery of the drive rotor, or both such forces, acts on and automatically moves the dam to its proper position relative to the dump hole.

IN THE DRAWINGS

Figure 1:
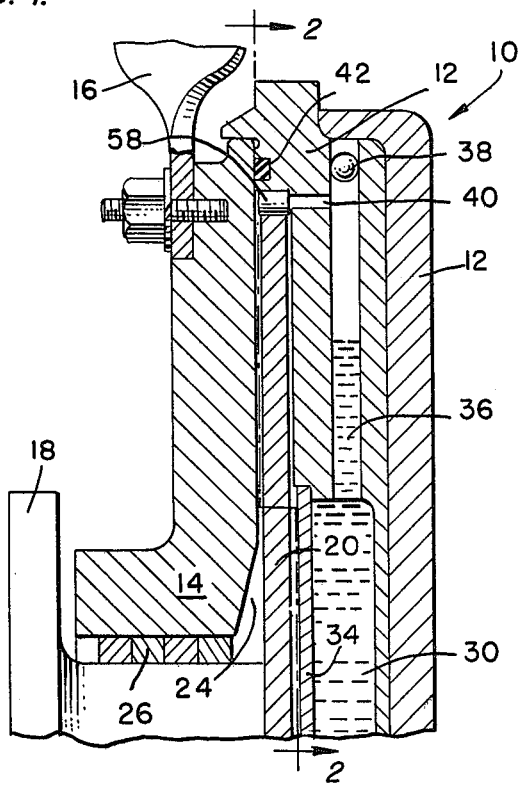
FIG. 1 is a partial cross-sectional view taken along the axis of rotation of a hydraulic coupling constructed in accordance with the practice of this invention.

Referring now to the drawings, the numeral 10 denotes generally a hydraulic coupling of the temperature controlled type which displays particular utility in coupling the engine to the radiator cooling fan in an internal combustion engine. It will be understood, however, that the invention is susceptible of use in any hydraulic coupling wherein it is desired to radially pump back a shear liquid from a peripheral portion to a radially innermost portion of the coupling. The numeral 12 denotes generally a housing cover in the general form of a flat plate having an outer peripheral edge while the numeral 14 denotes a housing which receives the cover. The numeral 18 indicates a rotary shaft element adapted to be coupled either directly or indirectly to an internal combustion engine. The other end of shaft 18 is suitably coupled to a drive rotor denoted by the numeral 20 and in the general form of a disc. Disc 20 is rotatable in drive chamber 24 with the sides of the disc slightly displaced from the sides of the drive chamber. Conventional seal and bearing elements denoted by the numeral 26 are positioned between shaft 18 and housing 14. The periphery of disc 20 is adjacent the outermost periphery of drive chamber 24. The numeral 30 denotes a shear reservoir centrally positioned within the housing cover and separated from drive chamber 24 by partition 34. While not illustrated, a temperature responsive valve is carried by either partition 34 or a part of the housing or the housing cover such that a fluid communication between drive chamber 24 and reservoir 30 is either opened or closed or partially open, depending upon the sensed temperature. The temperature which is sensed is usually that of the internal combustion engine or a temperature corrolated with the temperature of the internal combustion engine. The numeral 36 denotes a radially extending passageway communicating with reservoir 30, the top of the passageway being closed by a seal or plug in the form of a sphere 38. A dump hole 40 extends in an axial direction and communicates between passageway 36 and the radially outermost portion of drive chamber 24.

Figure 3:
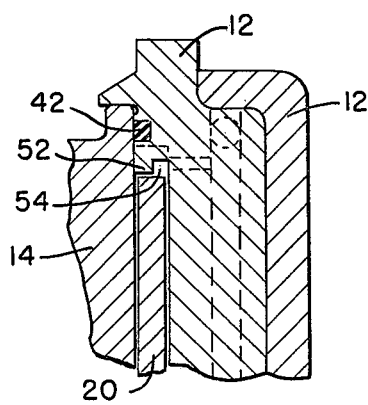
FIG. 3 is a view taken along section 3—3 of FIG. 2.
Figure 2:
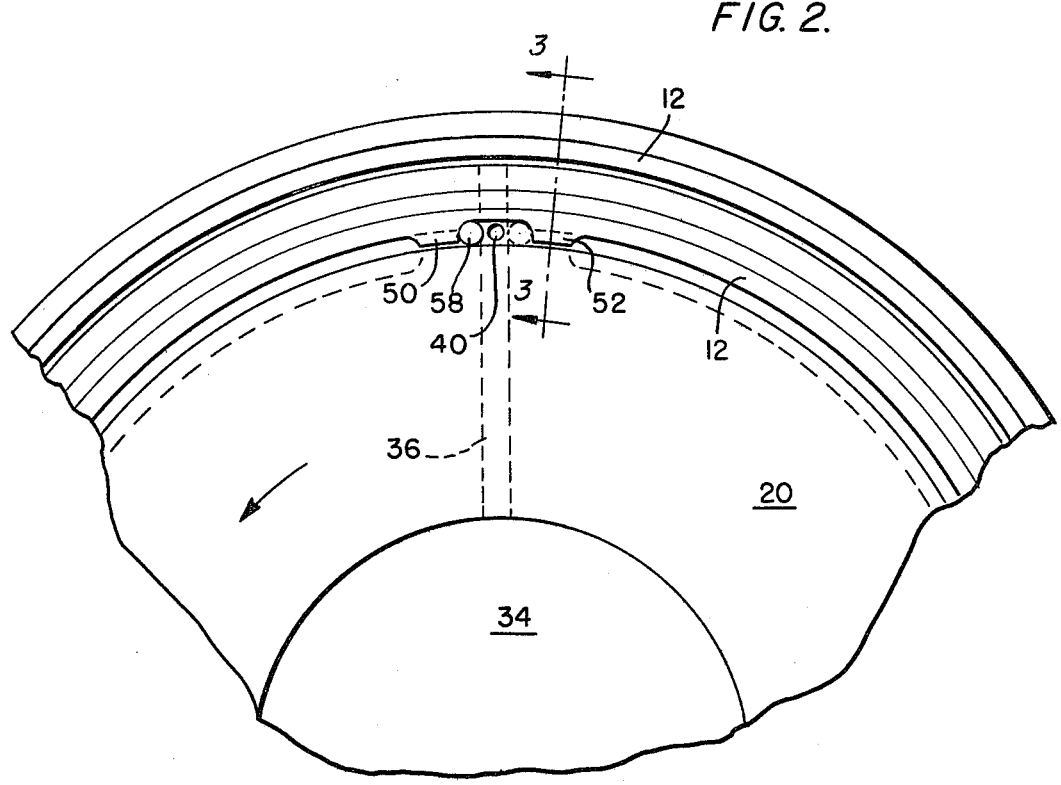
FIG. 2 is a view taken along section 2—2 of FIG. 1.

Referring now particularly in FIG. 2 of the drawings, the numeral 50 indicates one radially extending abutment and the numeral 52 a second radially extending abutment, both abutments being integral with housing cover 12. As shown at FIG. 3, the axial extent of each abutment 52 (as well as 50) is less than the axial width of drive disc 20. Thus a space 54 exists between, looking at FIG. 3, the righthand portion of the left face of housing cover 12 and the right portion of radially extending abutment 52. The purpose of this space will be apparent from what is to follow.

The numeral 58 denotes a short right circular cylinder positioned so that its longitudinal axis is parallel with the axis of rotation of the drive rotor 20. The length of the cylinder approximates the axial width or the thickness of the drive rotor 20 while the diameter of the cylinder is such that its longitudinal axis, in one angular position of the cylinder relative to the dump hole, is coincident with the axis of the dump hole 40. Cylinder 58 is termed a rolling dam and is positioned within a cage. The cage is defined by the radially extending abutments 50 and 52, the housing 14, the housing cover 12, and the periphery of drive rotor 20. Thus, the dam is free to move between one position on one side of the dump hole 40 and another position on the other side of dump hole 40, and executes limited angular movement relative to the periphery at the drive disc as may be seen by reference to FIG. 2 of the drawings. The diameter of the dam may be such that it frictionally contacts the outermost periphery of drive disc 20 or may be somewhat smaller so that it only rests upon the periphery of the drive disc. The reader will understand that while FIG. 2 depicts the dam 58 positioned on the uppermost portion of the coupling, this is merely illustrative and the angular position of the dam may be at another angular position such that passageway 36 is at any desired angle relative to the axis of rotation.

The manner of operation of the hydraulic coupling is as follows. Assume that the direction of relative rotation of the drive disc 20 with respect to the housing is in a counter-clockwise direction, or mode, as indicated by the curved arrow at FIG. 2. The shear liquid in reservoir 24 is forced radially outwardly by the action of centrifugal force and eventually finds its way to the periphery of the rotor. A portion of the shear liquid carried by the periphery of drive rotor 20 passes through space 54 (see FIG. 3) and into the cage. Should the rolling dam be at the righthand position of the cage as viewed at FIG. 2, the force of the liquid will force it to the left to thereby lodge it against abutment 50. Being now lodged against abutment 50, a portion of the shear liquid carried by the outer periphery of rotor 20 will find its way into dump hole 40 and thence will return through passageway 36 into reservoir 30. From reservoir 30 the liquid is, as previously explained, under the control of a temperature responsive or other type valve to establish or to regulate fluid communication between the reservoir and drive chamber 24 for a repetition of these actions.

In the event that the opposite direction of relative rotation (the other mode) between the drive rotor 20 and the housing is desired, the action will be the opposite and this time the force of the shear liquid carried by the outermost periphery of drive rotor 20 will force dam 58 to the opposite side (dashed line) of dump hole 40 from that illustrated at FIG. 2. At this position, a portion of this liquid will subsequently continuously find its way through dump hole 40 into passageway 36 for the same action as previously described. The reader will immediately comprehend a prime advantage of this construction. Namely, a single hydraulic coupling construction may be fabricated at a place of manufacture and used on internal combustion engines or other applications wherein either direction of relative rotation between the drive rotor 20 and the housing is desired. Once the device is assembled, the rolling dam 50 will automatically assume its proper position relative to the dump hole 40 so that the described circulation of shear liquid will take place. Preferably, the dam 58 assumes its proper position relative to one or the other of the abutments 50, 52 by virtue of the force of the fluid. However, this may be assisted by a slight frictional, squeezing contact between the dam and the rotor periphery. Further, while the dam is shown and described in the form of a right circular cylinder, it is obvious that it may assume other shapes for the purpose of yielding the same cooperation between the dump hole 40 and the cage in which it is placed. It will also be apparent that the described cage may be varied slightly to yield the desired results. For example, a bridge may connect the radially innermost portions of abutments 50 and 52 with a consequent lessening of the diameter of drive rotor 20. In such a construction, the periphery of drive rotor 20 would no longer define one of the elements of the cage.

What is claimed is:

1. A hydraulic coupling including a drive rotor within a drive chamber in a housing, a shear liquid within the drive chamber, a dam carried by the housing, the dam being contiguous to the periphery of the rotor, a passageway in the housing extending radially inwardly from the dump hole adjacent the dam to a shear liquid reservoir within the housing, the improvement comprising, the dam positioned within a cage for limited angular movement relative to the periphery of the drive disc between one position on one side of the dump hole and a second position at the other side of the dump hole, whereby the dam is automatically positioned relative to the dump hole by virtue of rotation of the drive rotor relative to the coupling housing, shear liquid carried by the drive rotor periphery striking the dam and automatically moving it to its proper position.

2. The hydraulic coupling of claim 1 wherein said dam is in the form of a cylinder whose longitudinal axis is parallel to the axis of rotation of the drive rotor.

3. The hydraulic coupling of claim 1 wherein the cage includes two radially inwardly extending abutments carried by the housing and extending partially into the drive chamber from the radially outermost portion of the drive chamber, each abutment positioned on a different side of the dump hole and adjacent thereto.

* * * * *